(12) United States Patent
Temares et al.

(10) Patent No.: US 7,966,226 B1
(45) Date of Patent: *Jun. 21, 2011

(54) METHOD AND SYSTEM FOR PURCHASE-BASED SEGMENTATION

(75) Inventors: Mark E. Temares, Garden City, NY (US); Alan B. Newman, Huntington, NY (US); Noor A. Menai, Summit, NJ (US)

(73) Assignee: Citicorp Credit Services, Inc., Long Island City, NY (US)

( * ) Notice: Subject to any disclaimer, the term of this patent is extended or adjusted under 35 U.S.C. 154(b) by 719 days.

This patent is subject to a terminal disclaimer.

(21) Appl. No.: 12/010,185

(22) Filed: Jan. 22, 2008

Related U.S. Application Data

(63) Continuation of application No. 10/947,589, filed on Sep. 22, 2004, now Pat. No. 7,328,169.

(60) Provisional application No. 60/504,432, filed on Sep. 22, 2003.

(51) Int. Cl.
*G06Q 30/00* (2006.01)

(52) U.S. Cl. ........ 705/26.7; 705/10; 705/14; 705/14.66; 705/53

(58) Field of Classification Search .............. 705/10, 705/14.53, 14.66, 26.7
See application file for complete search history.

(56) References Cited

U.S. PATENT DOCUMENTS

| | | | | |
|---|---|---|---|---|
| 5,375,244 | A | 12/1994 | McNair | 395/725 |
| 5,956,693 | A | 9/1999 | Geerlings | 705/14 |
| 6,073,112 | A | 6/2000 | Geerlings | 705/14 |
| 6,487,541 | B1 | 11/2002 | Aggarwal et al. | 705/26 |
| 6,622,126 | B1 | 9/2003 | McArdle et al. | 705/26 |
| 6,837,436 | B2 | 1/2005 | Swartz et al. | 235/472.02 |
| 2002/0069101 | A1 | 6/2002 | Vincent | 705/10 |
| 2002/0099609 | A1 | 7/2002 | Nascenzi et al. | 705/21 |
| 2002/0123923 | A1 | 9/2002 | Manganaris et al. | 705/10 |
| 2002/0133408 | A1 | 9/2002 | Walker et al. | 705/14 |
| 2002/0169655 | A1 | 11/2002 | Beyer et al. | 705/10 |
| 2002/0188509 | A1 | 12/2002 | Ariff et al. | 705/14 |
| 2003/0009393 | A1 | 1/2003 | Norris | 705/27 |
| 2003/0033237 | A1 | 2/2003 | Bawri | 705/37 |

(Continued)

FOREIGN PATENT DOCUMENTS

JP 2003187153 7/2003

OTHER PUBLICATIONS

McDonald, Frank P., "Whither the New Segmentation Systems?", *Marketing & Media Decisions*, New York, May 1985, vol. 20, Iss. 6, p. 94, 2 pp. (extracted from Proquest database on Apr. 23, 2007).

(Continued)

*Primary Examiner* — Yogesh C Garg
(74) *Attorney, Agent, or Firm* — Eric L. Sophir; SNR Denton US LLP

(57) ABSTRACT

A method and system for purchased-based segmentation of potential customers employs the use of actual, observed purchases instead of presumptions and correlations to improve the accuracy of segmentation and involves collecting empirical data for a client on actual purchasing behavior of a group of customers and applying statistical modeling techniques to the empirical purchasing behavior data to identify segments or clusters of the customers that exhibit similar purchasing propensity characteristics. Thereafter, the segments or clusters are further differentiated from one another according to other factors having a tendency to directly affect actual purchasing behavior of the customers within the segments or clusters, and potential customers are then identified according to a correlation with the segments or clusters for customized marketing.

8 Claims, 2 Drawing Sheets

U.S. PATENT DOCUMENTS

| | | | |
|---|---|---|---|
| 2003/0046204 A1 | 3/2003 | Chik | 705/35 |
| 2003/0061132 A1 | 3/2003 | Yu, Sr. et al. | 705/30 |
| 2003/0088491 A1 | 5/2003 | Liu et al. | 705/36 |
| 2003/0093414 A1 | 5/2003 | Litzow et al. | 707/3 |
| 2003/0097294 A1 | 5/2003 | Gordon | 705/10 |
| 2003/0158776 A1 | 8/2003 | Landesmann | 705/14 |
| 2003/0216956 A1 | 11/2003 | Smith et al. | 705/10 |
| 2005/0261987 A1 | 11/2005 | Bezos et al. | 705/27 |
| 2006/0136589 A1 | 6/2006 | Konig et al. | 709/224 |

OTHER PUBLICATIONS

Francese, Paula A. and Renaghan, Leo M., "Finding the Customer," *American Demographics*, Jan. 1991 (extracted from Proquest database on Apr. 23, 2007).

Press Release, "Acxiom Unveils Personicx LifeChanges, First-of-its-Kind System Recognizes Consumer Changes" [online], Aug. 11, 2004 [retrieved on Sep. 8, 2004], 2 pp., Retrieved from the Internet: http://biz.yahoo.com/bw/040811/115423_1.html.

Lindridge, Andrew, et al., "Is 'Culture' a Justifiable Variable for Market Segmentation? A Cross-Cultural Example," *Journal of Consumer Behaviour*, vol. 2, No. 3, pp. 269-286, Mar. 2003.

Yelkur, Rama, et al., "Differential Pricing and Segmentation on the Internet: The Case of Hotels," *Management Decision*, vol. 39, No. 4, pp. 252-261, 2001.

"Summary Lifestyle Descriptions—PRISM Cluster Narratives," Copyright 2000, Claritas, Inc., 20 pp.

Aidid, Sharifah, et al., "Modelling Market Shares by Segments Using Volatility," *Journal of Applied Statistics (JAST)*, vol. 26, No. 5, pp. 643-660, Jul. 1999.

Coakley, Debbie, "Latest Research Tools Give Marketers Better Insight into Customers," *Agri Marketing (Agri Mark)*, vol. 36, No. 10, pp. 24-28, Nov./Dec. 1998.

Funsten, David, et al., "Helping Your Customers Behave Themselves," *Bank Marketing*, vol. 30, No. 10, pp. 22-28, Oct. 1998.

Clieaf, Mark Van, "Identifying Your Most Profitable Customers," *Business Quarterly*, vol. 61, No. 2, pp. 54-60, Winter, 1996.

Berry, Alexander III, "Using Market Segmentation for Corporate Customers," *Commercial Lending Review*, vol. 10, No. 3, pp. 36-47, Summer, 1995.

Segal, Madhav N., et al., "Market Segmentation and Competitive Analysis for Supermarket Retailing," *International Journal of Retail & Distribution Management*, vol. 22, No. 1, pp. 38-48, 1994.

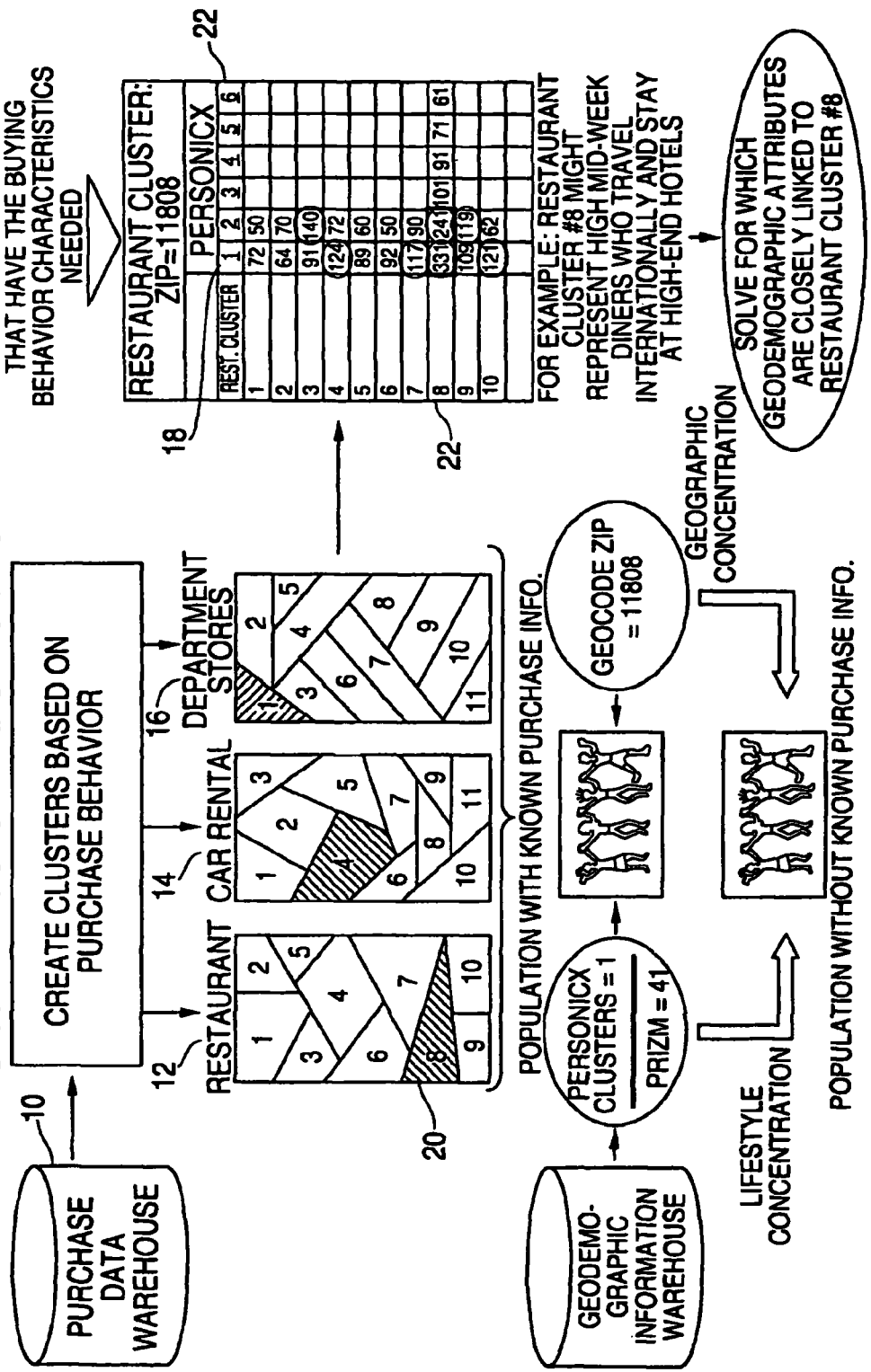

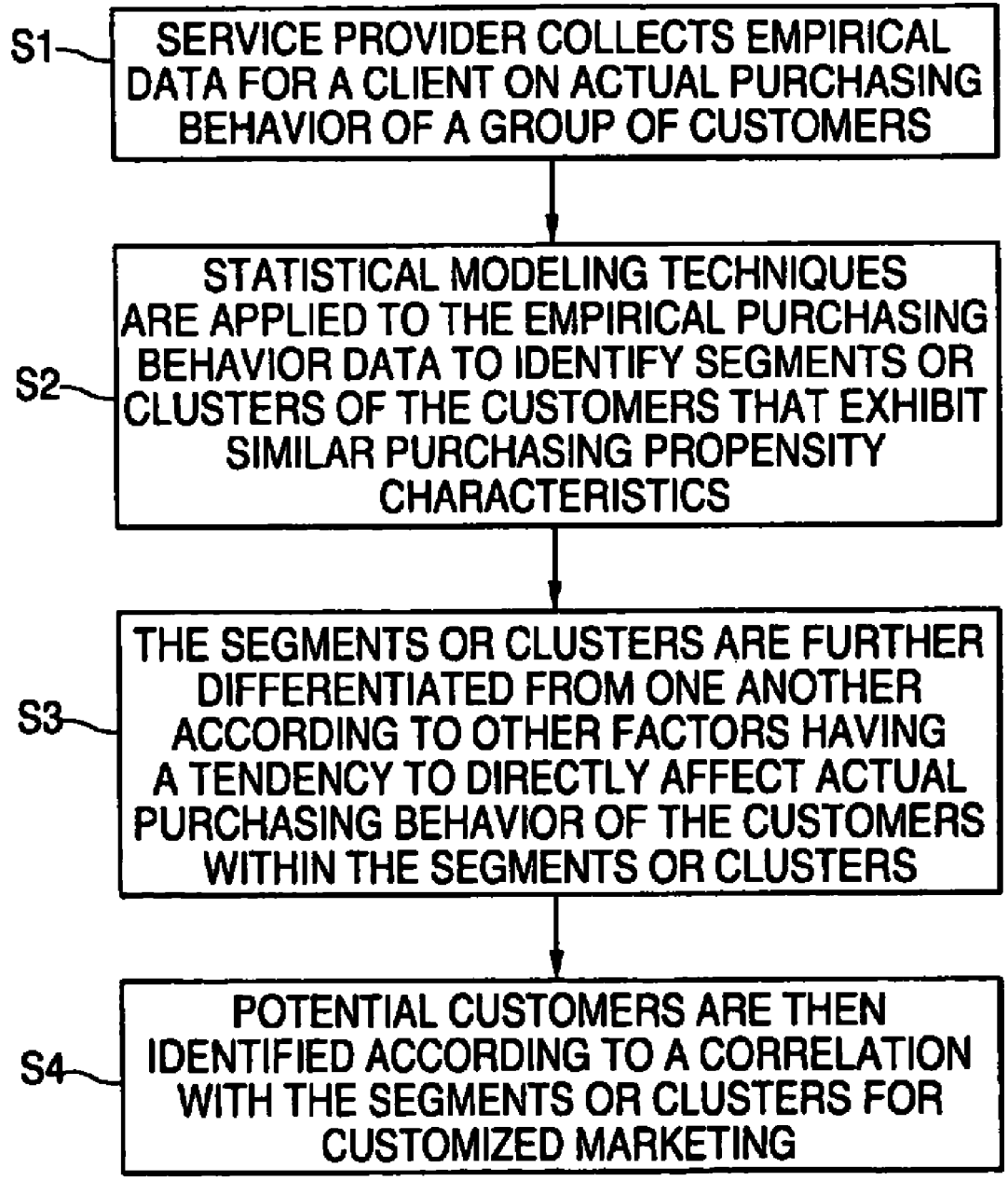

METHOD AND SYSTEM FOR PURCHASE-BASED SEGMENTATION

CROSS REFERENCE TO RELATED APPLICATIONS

This application is a continuation of application Ser. No. 10/947,589 filed Sep. 22, 2004, now U.S. Pat. No. 7,328,169 entitled "METHOD AND SYSTEM FOR PURCHASE-BASED SEGMENTATION" which claims the benefit of U.S. Provisional Application No. 60/504,432 filed Sep. 22, 2003, entitled "METHOD AND SYSTEM FOR PURCHASE-BASED TARGETING" and incorporated herein by this reference. Each and every document, including patents and publications, cited herein is incorporated in its entirety as though recited in full herein.

FIELD OF THE INVENTION

The present invention relates to methods and systems associated with purchase-based segmentation and clustering used in commercial transactions, and more particularly to methods and systems for implementing purchase-based segmentation and clustering programs which can be used to improve the success of various commercial efforts. These may include direct marketing (e.g., direct-to-customer advertising, direct mail, couponing); creating marketing-related services for retailers, product/service providers and others based on actual purchase behavior of identified customers and similar customers; providing a means of understanding the actual behavior of a retailer or product/service provider's customers versus the behavior of those same customers with competitors, and versus the behavior of competitors' other customers; merchandise planning; real estate planning; and other applications.

BACKGROUND OF THE INVENTION

A key essence and aim of segmentation and clustering is to maximize the return on marketing investments by directing marketing efforts towards those more likely to respond favorably, and reducing marketing efforts to those less likely to respond favorably.

To maximize the effectiveness of segmentation and clustering methodologies, the marketer must have a means of differentiating those more likely to respond. Many techniques exist for differentiation, including techniques related to geographic factors (e.g. determine those living near existing customers), demographic factors (e.g. determine those with high incomes, or those with children in the household), and psychographic/lifestyle factors (e.g. determine those who have active lifestyles, those who engage in crafting, or those who attend church regularly).

Once the differentiating factors are identified, the marketer's next challenge is to determine, given the communication medium selected, how best to reach the desired prospects with a minimum of waste. This can include purchasing advertising time on certain television stations or during certain programs watched disproportionately by the desired prospects, purchasing mailing lists of subscribers to magazines that serve the desired customers' interests, concentrating advertising in local newspapers in selected geographies, and many other means. It could also include adjusting the positioning/messaging of the product or service being marketed to align better with the behaviors and attitudes expressed by the desired prospects, selecting merchandise and store locations more likely to appeal to the desired prospects, and other applications.

Among the methods available to marketers to identify likely purchasers are those methods known as "clustering". These methods assign households or individuals to one of a number of discrete segments or clusters based on a statistical "best fit" methodology that takes into account a number of the factors above.

In all of the above methods described, any success achieved by the marketer is a function of presumptions and correlations. For example, a sporting goods marketer may achieve better results by mailing to subscribers of Sports Illustrated than by mailing to subscribers of Time, because readers of Sports Illustrated are more likely to participate in sports (that is, there may be a better correlation between reading Sports Illustrated and sports participation than there is with reading Time). However, results are relative, and the actual response may be small. Many readers of Sports Illustrated are spectators, not participants. Many others are participants, but not necessarily users of the sorts of products sold by the sporting goods marketer.

SUMMARY OF THE INVENTION

It is a feature and advantage of the present invention to provide a methodology and system for purchased-based segmentation of potential customers which employs the use of actual, observed transactions, rather than presumptions and correlations, to improve the accuracy of segmenting and reaching prospects.

It is another feature and advantage of the present invention to provide a methodology and system for purchased-based segmentation of potential customers which employs the use of actual, observed purchases to improve the accuracy of segmentation when the purchasers are known to the provider as a means of facilitating marketing to the actual purchasers of a product or category.

It is an additional feature and advantage of the present invention to provide a methodology and system for purchased-based segmentation of potential customers which employs the use of actual, observed purchases to improve the accuracy of segmentation when the specific purchasers or their transactions are not known to the provider, or when key data about them are not available, as a means of creating more accurate and effective marketing via correlation with other behaviors and by enhancing existing methodologies.

It still another feature and advantage of the present invention to provide a methodology and system for purchased-based segmentation of potential customers that provides insights into the actual observed behavior of segmented customers at competitors and into the actual observed behavior of competitors' customers.

To achieve the stated and other features, advantages and objects, embodiments of the present invention utilize, for example, computer hardware, operating systems, programming languages, software applications, and other technology to provide methods and systems for purchased-based segmentation of customers in which empirical data is collected by a service provider for a client on actual purchasing behavior of a group of customers. The data can be collected, for example, directly or indirectly as a byproduct of use of payment devices, such as credit cards, debit cards, stored value cards, and/or radio frequency identification devices, provided to the customers by the client or a third party. Alternatively, the data can be collected, for example, directly or indirectly as a byproduct of use of benefit credentials, such as warranty cards, rebate forms, barcode scans, and proof of purchase data, provided to the customers by the client or a third party.

In an embodiment of the invention, statistical modeling techniques are applied to the empirical purchasing behavior data to identify segments or clusters of the customers that exhibit similar purchasing propensity characteristics in terms, for example, of likelihood of future purchases from the client and/or from a third party. The segments or clusters are further differentiated from one another according to other factors, such as geodemographic and psychographic/lifestyle factors, having a tendency to directly affect actual purchasing behavior of the customers within the segments or clusters. Based on a correlation with the segments or clusters, for example, via indexing, potential customers, who may be customers of the client and/or customers of third parties, can then be identified for customized marketing.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 1 is a schematic diagram that illustrates an example of key components and relationships between key components of the process of purchased-based segmentation of potential customers utilizing data regarding actual, observed purchases and statistical modeling and clustering techniques for embodiments of the invention.

FIG. 2 is flow diagram that illustrates an example of the process of purchased-based segmentation of potential customers utilizing data regarding actual, observed purchases and statistical modeling and clustering techniques for embodiments of the invention.

DETAILED DESCRIPTION

Referring now in detail to embodiments of the present invention, examples of which are illustrated in the accompanying drawings, each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In preferred embodiments, the invention uses various methods to collect data about the actual purchases of individuals, households, and/or businesses ("prospects"); uses statistical modeling techniques to create segments or clusters based on the actual purchases, provides the information on how, or the actual means, to reach these prospects when the actual prospects are known to the user of the invention (e.g. customers of the user, or names and addresses acquired through third parties); and uses actual purchases of others to enhance methodologies that provide predictions of segment/cluster membership or specific behavior ("index values" and/or scores) for prospects for whom actual purchase information is not available.

In preferred embodiments, the invention can use similar data collection and segmentation methods, and then provides information and insights on how actual purchases of customers of a specific client (e.g. a retailer or product/service provider) compare to purchases by those same customers at competitors or at non-competitors, how the behavior of that client's customers may or may not differ from the behavior of non-customers, and/or how the customers themselves may differ.

Methods of data acquisition include those methods through which data is acquired directly by the user, and those which collect data from others who possess it. Among the former are: issuance of payment devices (e.g. credit and debit cards, RFID devices, etc.), where purchase data can be a byproduct of facilitating the purchase transaction; issuance of a "benefit credential" (e.g. a loyalty program or "frequent shopper" identifier), where, again, data collection is a byproduct of facilitating other customer benefits; or by collecting information directly from the actual customers themselves through various means (e.g. warranty cards, rebate forms requiring proof of purchase, scanning of barcodes received in the house, premiums and prizes requiring proof of purchase or collection of multiple proofs, etc.).

Among the latter are collection of customer and/or purchase information directly or indirectly from other issuers of payment devices or benefit credentials, collection of customer and/or purchase information directly or indirectly from one or more merchants, and collection of customer and/or purchase information from other third party sources who use various means to obtain that information.

In embodiments of the present invention, for each retailer or product/service provider who is interested in obtaining better information, or for categories of retailers or products/services, statistical modeling and/or clustering methods are used to create segments or clusters of relatively more likely and relatively less likely purchasers, with varying degrees in between. Key statistical drivers of the segments or clusters will be actual purchases at the specific retailer or of the product/service providers' products, and similar purchases in related stores or categories. Other factors which appear to drive the actual purchases will also be used to create further differentiation among, and maximum homogeneity within, segments or clusters, including purchases at other stores or categories, methods of purchase, and geodemographic and psychographic/lifestyle factors (e.g., a heavy shopper in the category who does not live near any outlets of a retailer should be significantly less likely to shop at that retailer, even though actual purchases in the category would, on their own, indicate otherwise).

The segments or clusters, which may be expressed as names, ordinal numbers, indices, or statistically-based scores, can then be used by retailers or product/service providers in various ways, including, in embodiments of the present invention: by choosing mass media more likely to reach individuals/households in the highest-potential segments or clusters, by observing and understanding differences in their own customers' behaviors and competitive customers' behaviors from segment or cluster to segment or cluster and adjusting offers, products, product mixes/merchandising, store formats and locations, and other means of doing business and attracting and serving customers accordingly.

In embodiments of the present invention, the user or its retailer and product/service provider clients may also combine the information created from segments or clusters with its own and other data to market to known individuals/households in the highest potential segments or clusters, and to identify other individuals likely to be in the highest potential segments or clusters, but for whom specific purchase information is not known to the user. This can be performed through the techniques of indexing and/or scoring. Embodiments of this invention include indexing to specific individual factors or sets of factors (e.g. customers in a specific high potential segment or cluster have an index of 250 for home ownership, that is, they are 2.5 times as likely to own a home than average. This could indicate that targeting homeowners would be an efficient means of reaching unknown potential customers), or indexing to existing clustering methodologies using other, non-purchase-driven clustering techniques (e.g. customers in a specific high potential segment or cluster have an index of 600 in another clustering methodology's "cluster twelve").

The advantage to marketers of indexing to other factors or clusters is that, for certain means of marketing, the relationship of the marketing channel to the other factors or clusters is already established and known. For example, there are not, at present, indices of television viewers by show for the segments or clusters created in the embodiments of the invention described here, nor, as many of the segments or clusters created will be custom for particular clients, are there likely to be. However, indices of television viewers by show are widely available for many specific geodemographic and psychographic/lifestyle variables, and for at least two clustering methodologies provided by commercial companies (Personicx® and PRIZM®). By providing an index or similar overlay measure to existing factors or clusters, then, marketers can use these known factors and clusters to select media. Using the numbers in the example above, marketers would seek to advertise on television shows disproportionately appealing to homeowners (for example, home improvement shows), or to those in the other clustering methodology's cluster twelve.

In embodiments of this invention related to understanding customers of competitors or non-competitors versus their own customers, retailers and product/service providers can use segments or clusters in several ways. When segments or clusters are created for an overall category, retailers and product/service providers can compare the relative presence of their and others' customers in each segment or cluster, and use the characteristics of the segment or cluster to generate insights about the nature of their own and competitors' or non-competitors' clients. When segments or clusters are created separately for the customers of the retailer or product/service provider and for customers of the competitors or non-competitors, the characteristics of overlapping and non-overlapping segments or clusters can be identified and compared. In either case, as with all of the above, the ability of the segmentation or clustering in embodiments of the present invention to be based on actual purchase behavior or actual purchase transactions provides a significant advantage in improving the results of marketing and research efforts, leading to increased efficiency in marketing, sales, and other business functions.

FIG. 1 is a schematic diagram that illustrates an example of key components and relationships between key components of the process of purchased-based segmentation of potential customers utilizing data regarding actual, observed purchases and statistical modeling and clustering techniques for embodiments of the invention. Referring to FIG. 1, there is a large data warehouse (10) of purchases. Using those purchases, if, for example, there is an interest in looking for customers who had a high likelihood of eating at casual dining restaurants, clusters of purchasers who show casual dining restaurants behavior can be developed. Some of those clusters might be, as examples, customers who go to casual dining restaurants during the week but not on weekends; customers who go on weekends but not during the week; customers who go very frequently; people who go infrequently; non-customers (those who never go); customers who go to casual dining restaurants and also to white-tablecloth restaurants; customers who go to casual dining restaurants and quick service restaurants but not to white-tablecloth; and so on. The characteristics of both restaurant purchase behavior and non-restaurant purchase behavior that creates the greater differentiation among segments for various types of purchasing behavior (restaurants 12, car rentals 14, department stores 16, clothing, etc.) are identified. It should be understood that the differentiating behaviors could be within or outside the category.

Several things can be done with the segments or clusters. Marketing to the people in those specific segments or clusters can be facilitated and customized either by a particular restaurant, by a category, or more broadly. Marketing to the customer base can therefore be facilitated. In the present embodiment, the customer base refers to the base of people for whom there is knowledge.

Additionally, "birds of a feather" can be determined, that is, potential customers who appear to be just like the customers in the desired segments or clusters but are not exhibiting the behaviors. These may be potential customers who are in the customer base but who make their purchases via methods which cannot be observed in the data, or may be potential customers who are not in the customer base. Furthermore, the segments or clusters that are developed can be compared to existing known segmentation or clustering schemes and incidences of high overlap may be determined in particular to other segmentation or clustering schemes.

In the embodiment shown in FIG. 1, in the restaurant cluster 12 and Personicx cluster "one" (18), the person in restaurant cluster "eight" (20) is 3.3 times as likely to occur in Personicx cluster "one" (18) and only about 60 percent as likely to occur in Personicx cluster "six" (22). The advantage of knowing that is that certain clustering schemes have already been mapped to external sources. For example, for almost every magazine, the readership has already been indexed to Personicx clusters. Therefore, media buyers already know in which magazines to advertise to reach prospects in the desired Personicx clusters. Further, in reference to restaurant cluster "eight" (20), indexing can be done directly between all the media and this cluster, or instead, as illustrated, the restaurant cluster determined in the illustrated embodiment can be mapped over to other existing customer schemes, e.g., Personicx. This cluster can similarly be correlated with geographic or demographic information to identify prospective customers.

FIG. 2 is flow diagram that illustrates an example of the process of purchased-based segmentation of potential customers utilizing data regarding actual, observed purchases and statistical modeling and clustering techniques for embodiments of the invention. Referring to FIG. 2, at S1, a service provider collects empirical data for a client on actual purchasing behavior of a group of customers. At S2, statistical modeling techniques are applied to the empirical purchasing behavior data collected by the service provider in order to identify clusters of the customers that exhibit similar purchasing propensity characteristics. At S3, the clusters are further differentiated according to other factors that have a tendency to directly affect actual purchasing behavior of the customers within the clusters, and at S4, potential customers for customized marketing are identified according to a correlation with the clusters.

Although some embodiments use credit card purchase data, there are many other sources of data that can be used to create the segments or clusters. For example, debit card data or data using the merchants' benefit credentials; or by purchasing from others that have the data or allying with others that have it on a partnership basis to obtain the data they have. For example, credit card issuers have data; ACNielsen has data that is obtained directly from stores; issuers of ID devices and other credentials have data; issuers of debit cards have data; and the stores themselves have data.

Embodiments of the present invention have now been generally described in a non-limiting manner. It will be appreciated that these examples are merely illustrative of the present invention. Many variations and modifications will be apparent to those of ordinary skill in the art.

What is claimed is:

1. A method for purchased-based segmentation of customers, comprising:
   collecting, using a computer having a processor and memory, empirical data for a client on actual purchasing behavior of a group of customers, said empirical data consisting of actual observed customer and purchase information associated with purchase behavior of the client's customers and third parties' customers collected as a byproduct of use of payment devices and benefit credentials issued by the client and the third parties to their respective customers forming part of the group of customers;
   applying, using the computer, statistical modeling techniques to the empirical purchasing behavior data to identify segments or clusters for an overall category of the client's and the third parties' customers and for separate categories for the client's customers and the third parties' customers;
   identifying, using the computer, characteristics indicative of purchasing behavior for the segment or cluster for the overall category, comparing a relative presence of the client's customers and the third parties' customers in the segment or cluster for the overall category and generating information about the purchasing behavior of the client's customers and the third parties' customers based at least in part on the identified characteristics of the segment or cluster for the overall category;
   identifying, using the computer, characteristics indicative of purchasing behavior for overlapping and non-overlapping ones of the separate segments or clusters and generating information about purchasing behavior of the client's customers and the third parties' customers based at least in part on a comparison of the identified characteristics of the overlapping and non-overlapping ones of the separate segments or clusters; and
   identifying, using the computer, potential customers for customized marketing according to a correlation with the segments or clusters and the information generated about the purchasing behavior of the client's customers and the third parties' customers.

2. The method of claim 1, wherein collecting the empirical data further comprises collecting the empirical data as a byproduct of use of payment devices provided to the customers selected from a group consisting at least in part of credit cards, debit cards, stored value cards, and radio frequency identification devices.

3. The method of claim 1, wherein collecting the empirical data further comprises collecting the empirical data as a byproduct of use of benefit credentials selected from a group consisting at least in part of warranty cards, rebate forms, barcode scans, and proof of purchase data.

4. The method of claim 1, wherein identifying potential customers for customized marketing further comprises identifying customers within the segments or clusters who are customers of the client for customized marketing by the client according to a correlation with the segments or clusters.

5. The method of claim 1, wherein identifying potential customers for customized marketing further comprises identifying customers within the segments or clusters who are customers of a third party for customized marketing by the client according to a correlation with the segments or clusters.

6. The method of claim 1, wherein identifying potential customers for customized marketing further comprises identifying potential customers for customized marketing according to a correlation with the segments or clusters via indexing.

7. A machine for purchased-based segmentation of customers, comprising:
   a computer having a processor and memory, the processor being programmed for:
   collecting empirical data for a client on actual purchasing behavior of a group of customers, said empirical data consisting of actual observed customer and purchase information associated with purchase behavior of the client's customers and third parties' customers collected as a byproduct of use of payment devices and benefit credentials issued by the client and the third parties to their respective customers forming part of the group of customers;
   applying statistical modeling techniques to the empirical purchasing behavior data to identify segments or clusters for an overall category of the client's and the third parties' customers and for separate categories for the client's customers and the third parties' customers;
   identifying characteristics indicative of purchasing behavior for the segment or cluster for the overall category, comparing a relative presence of the client's customers and the third parties' customers in the segment or cluster for the overall category and generating information about the purchasing behavior of the client's customers and the third parties' customers based at least in part on the identified characteristics of the segment or cluster for the overall category;
   identifying characteristics indicative of purchasing behavior for overlapping and non-overlapping ones of the separate segments or clusters and generating information about purchasing behavior of the client's customers and the third parties' customers based at least in part on a comparison of the identified characteristics of the overlapping and non-overlapping ones of the separate segments or clusters; and
   identifying potential customers for customized marketing according to a correlation with the segments or clusters and the information generated about the purchasing behavior of the client's customers and the third parties' customers.

8. A computer-implemented method for purchased-based segmentation of customers, comprising:
   collecting, by a computer of a service provider, empirical data for a client on actual purchasing behavior of a group of customers, said empirical data consisting of actual observed customer and purchase information associated with purchase behavior of the client's customers directly by the provider as a byproduct of use of payment devices and benefit credentials issued by the client to its customers forming part of the group of customers and consisting further of purchase information associated with purchase behavior of third parties' customers acquired indirectly by the provider from other sources collected as a byproduct of use of payment devices and benefit credentials issued by the third party to its customers forming part of the group of customers;
   applying, by a computer, statistical modeling techniques to the empirical purchasing behavior data to identify segments or clusters for an overall category of the client's and the third parties' customers and for separate categories for the client's customers and the third parties' customers;

identifying, by a computer, characteristics indicative of purchasing behavior for the segment or cluster for the overall category, comparing a relative presence of the client's customers and the third parties' customers in the segment or cluster for the overall category and generating information about the purchasing behavior of the client's customers and the third parties' customers based at least in part on the identified characteristics of the segment or cluster for the overall category;

identifying, by a computer, characteristics indicative of purchasing behavior for overlapping and non-overlapping ones of the separate segments or clusters and generating information about purchasing behavior of the client's customers and the third parties' customers based at least in part on a comparison of the identified characteristics of the overlapping and non-overlapping ones of the separate segments or clusters; and identifying, by a computer, potential customers for customized marketing according to a correlation with the segments or clusters and the information generated about the purchasing behavior of the client's customers and the third parties' customers via indexing.

* * * * *